US 7,463,153 B2

United States Patent
Hunt et al.

(10) Patent No.: US 7,463,153 B2
(45) Date of Patent: Dec. 9, 2008

(54) LOCATING A DEVICE IN A GIVEN STATE

(75) Inventors: Christian Lee Hunt, Cary, NC (US); Vincent Mitchel Padua, Chapel Hill, NC (US); Robin Radez, Westport, CT (US); William Alexander Reichert, III, Buda, TX (US); Gregory Covert Smith, Raleigh, NC (US); Oriana Jeannette Williams, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 11/244,361

(22) Filed: Oct. 5, 2005

(65) Prior Publication Data

US 2007/0075862 A1   Apr. 5, 2007

(51) Int. Cl.
*G08B 13/14* (2006.01)
(52) U.S. Cl. ............... 340/572.4; 340/10.4; 340/825.49
(58) Field of Classification Search ............... 340/572.1, 340/572.4, 10.1, 10.4, 10.41, 825.49
See application file for complete search history.

(56) References Cited

U.S. PATENT DOCUMENTS

| | | | | |
|---|---|---|---|---|
| 5,287,266 A | * | 2/1994 | Malec et al. | 340/825.49 |
| 5,664,113 A | * | 9/1997 | Worger et al. | 705/28 |
| 5,949,335 A | | 9/1999 | Maynard | 340/572.1 |
| 6,025,780 A | | 2/2000 | Bowers et al. | 340/572.3 |
| 6,176,425 B1 | * | 1/2001 | Harrison et al. | 235/385 |
| 6,249,227 B1 | | 6/2001 | Brady et al. | 340/572.1 |
| 6,525,648 B1 | * | 2/2003 | Kubler et al. | 340/572.1 |
| 6,720,866 B1 | * | 4/2004 | Sorrells et al. | 340/10.4 |

OTHER PUBLICATIONS

Naef, W. "General Best Practices for Laptop Security", INFOCON, IN04-001, Jun. 8, 2004.
Juels, A. et al. "Soft Blocking: Flexible Blocker Tags on the Cheap", WPES '04, pp. 1-7, Washington, DC, Oct. 28, 2004.
Greenberg, S. et al. "Customizable Physical Interfaces for Interacting with Conventional Applications", UIST '02, vol. 4, Issue 2, pp. 31-40, Oct. 27-30, 2002.
AbuSafiya, M. et al. "Accommodating Paper in Document Databases", DocEng '04, pp. 155-162, Oct. 28-30.
Mesarina, Malena, "Demo Abstract: Automating Server Tracking for Data Centers", SenSys '04, p. 307, Nov. 3-5, 2004.

* cited by examiner

*Primary Examiner*—Thomas J Mullen, Jr.
(74) *Attorney, Agent, or Firm*—David Irvin, Esq.; Steven M. Greenberg, Esq.; Carey Rodriguez Greenberg & Paul LLP

(57) ABSTRACT

Methods and computer program products for locating devices having a given state by locating a device using an RFID tag associated with the device that responds to queries from an RFID tag reader independently of the state of the device, and determining the state of the device using an RFID tag associated with the device that responds selectively in dependence upon the state of the device. The invention also includes systems for locating devices having a given state. The systems comprise an RFID tag reader for locating a device by reading an RFID tag associated with the device that responds independently of the state of the device, and an RFID tag reader for determining the state of the device by reading an RFID tag associated with the device that responds selectively in dependence upon the state of the device.

9 Claims, 5 Drawing Sheets

LOCATING A DEVICE IN A GIVEN STATE

RELATED APPLICATIONS

Attention is directed to the commonly assigned, co-pending U.S. patent application by the same inventors, entitled "Network Management Using Suppressible RFID Tags."

BACKGROUND

The present invention concerns the field of inventory management, and more particularly concerns using RFID tags to locate devices and other assets having a given state.

Radio frequency identification (RFID) tags provide an inexpensive way to manage inventory by enabling the process of locating various devices. Here, locating a device means determining its coordinates or position in a spatially referenced sense, where the term coordinates is used broadly. The coordinates can be, for example, latitude and longitude, distance and direction from a known reference point, proximity to a given intersection such as the intersection of aisles in an office or warehouse, a shelf label location in a warehouse, a room number in an office building, and so forth.

In some situations, an RFID infrastructure can be set up having a number of stationary RFID tag readers located throughout a building or campus, and an edge controller to collate or consolidate information provided by the RFID tag readers. Such a system, which may be called an RFID networked-system application, can locate or track monitored devices that are equipped with RFID tags as the devices move within a geographic area. For example, such a system may be used to locate and track equipment carts in a hospital, forklifts or textbooks in a warehouse, and the like.

Although such RFID networked-system applications are quite effective in locating and tracking devices, they are unable to provide any information concerning the devices beyond their locations. In particular, RFID networked-system applications fail to convey any information regarding the state of the monitored devices. This can be a significant limitation. For example, hospital staff may use such a system to locate the nearest equipment cart, only to find that the nearest cart is presently in use. Likewise, a factory foreman may locate the nearest forklift using such as system, only to find that its battery is discharged.

Thus, there is a need to improve RFID networked-system applications by enabling them to provide state information in addition to locations and trajectories.

SUMMARY

Aspects of the invention include methods and computer program products for locating devices having a given state by locating a device using an RFID tag reader and a first RFID tag associated with the device that responds to queries from an RFID tag reader independently of the state of the device, and determining the state of the device using an RFID tag reader and a second RFID tag associated with the device that responds selectively in dependence upon the state of the device. Another aspect of the invention includes systems for locating devices having a given state. The systems comprise an RFID tag reader for locating a device by reading a first RFID tag associated with the device that responds independently of the state of the device, and an RFID tag reader for determining the state of the device by reading a second RFID tag associated with the device that responds selectively in dependence upon the state of the device.

BRIEF DESCRIPTION OF THE SEVERAL VIEWS OF THE DRAWINGS

The invention may be better understood by reading the following detailed description together with the drawings, wherein.

DETAILED DESCRIPTION

Figure 1:
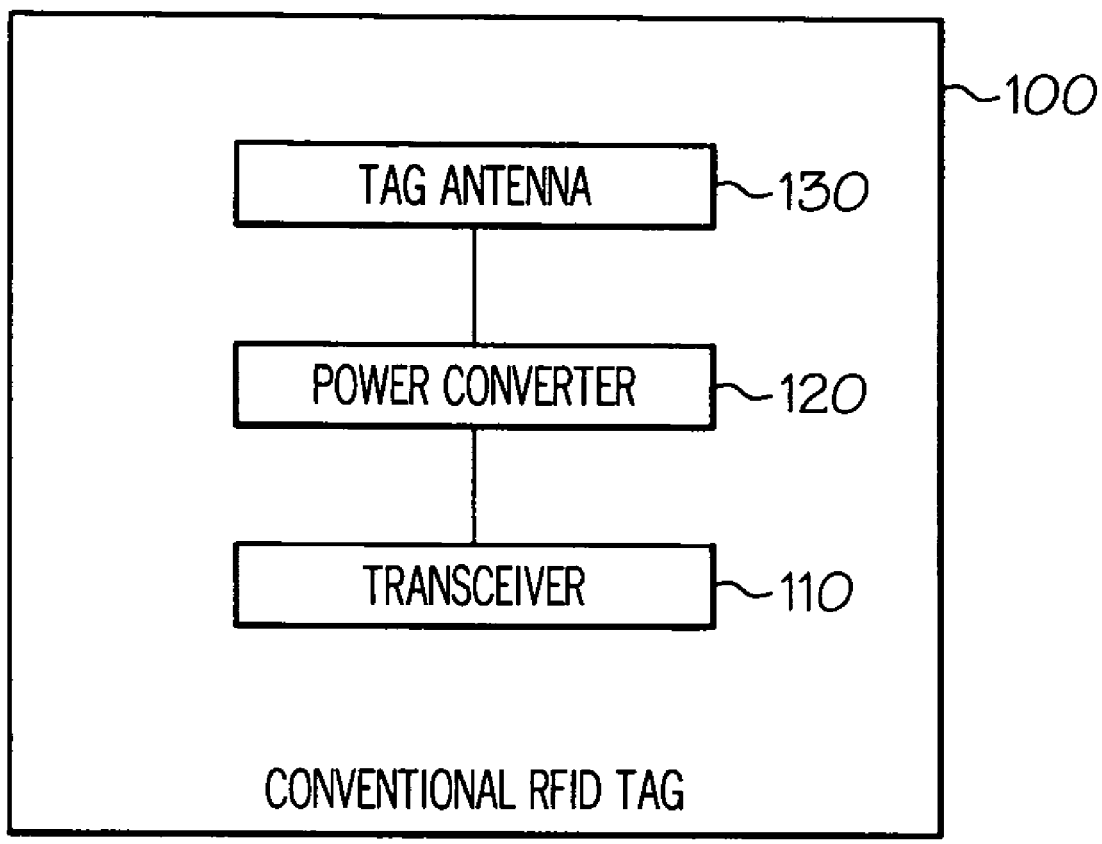
FIG. 1 shows a block diagram of a conventional RFID tag.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, aspects of the present invention may be embodied as a method, data processing system, or computer program product. Accordingly, aspects of the present invention may take the form of embodiments entirely in hardware, entirely in software, or in a combination of hardware and software referred to as circuits and modules.

Furthermore, aspects of the present invention may take the form of a computer program product on a computer-usable storage medium having computer-usable program code embodied in the medium. Any suitable computer-readable medium may be utilized, including hard disks, CD-ROMs, optical storage devices, magnetic storage devices, and transmission media such as those supporting the Internet or an intranet.

Computer program code for carrying out operations of the present invention may be written in an object oriented programming language such as Java, Smalltalk, or C++. However, the computer program code for carrying out operations of the present invention may also be written in conventional procedural programming languages, such as the C programming language. The program code may execute entirely on a single computer or distributed over a plurality of computers.

The present invention is described below with reference to flowchart illustrations and/or block diagrams of methods, apparatus (systems), and computer program products according to embodiments of the invention. It will be understood that blocks of the flowchart illustrations and diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

FIG. 1 shows a block diagram of a conventional RFID tag. This diagram is introduced mainly as a descriptive convenience to be used in clearly differentiating the suppressible RFID tag described below with reference to FIG. 2 from the conventional RFID tag of FIG. 1.

As shown in FIG. 1, a conventional RFID tag 100 comprises a transceiver 110, a power converter 120, and a tag antenna 130. As is well known to those skilled in the art, a conventional passive RFID tag receives electromagnetic energy through the tag antenna 130 when read or queried by a tag reader. The power converter 120, which may be, for example, a rectifier and a simple filter such as a capacitor, transforms the received energy into a form suitable to power the transceiver 110, in order that the transceiver 110 may respond to the tag reader. In contrast to passive RFID tags, active RFID tags may include an internal power source such as a small battery, which eliminates the need to power the transceiver 110 from energy received by the tag antenna 130. Since conventional RFID tags both passive and active are well known to those skilled in the art, no further elaboration will be given here.

A type of RFID tag called here a suppressible RFID tag will now be described with reference to FIGS. 2A-2B. Unlike a conventional RFID tag of the kind just described, which may respond to the tag reader whenever the tag is within range of the reader, a suppressible RFID tag may respond selectively to the tag reader, in dependence upon a condition that is conveyed by a control signal that is externally provided to the suppressible RFID tag. Thus, to say that a suppressible RFID tag responds selectively means that the tag responds to queries from an RFID tag reader, or does not respond, depending on the state of the control signal.

Figure 2A:
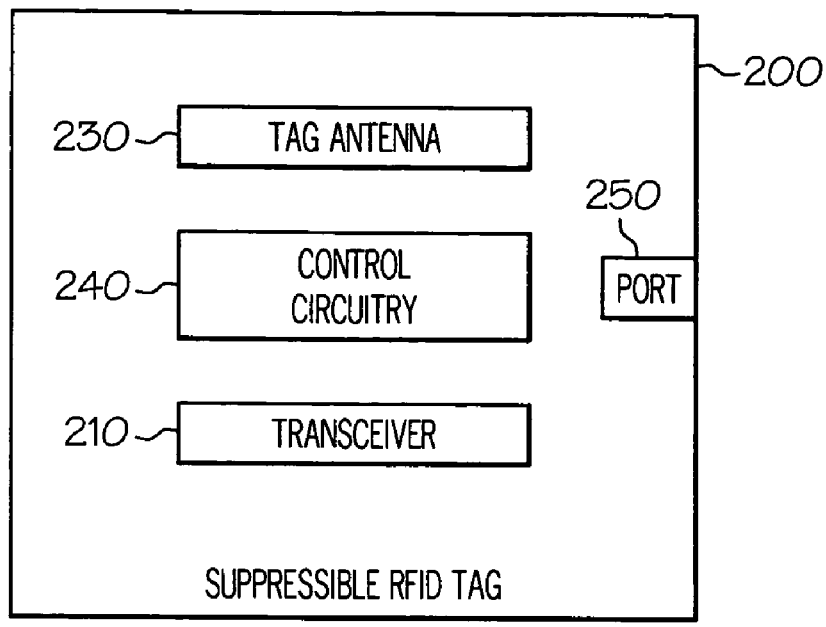
FIGS. 2A-2B show block diagrams of exemplary suppressible RFID tags.

FIG. 2A shows an exemplary structure of a suppressible RFID tag 200. In FIG. 2A, the suppressible RFID tag 200 comprises a transceiver 210, a tag antenna 230, control circuitry 240, and a port 250. The suppressible RFID tag 200 may be active or passive. In a preferred embodiment, the suppressible RFID tag 200 is passive, meaning that power for the transceiver 210 is derived from energy received from a tag reader by the tag antenna 230.

A control signal, which may be conveyed by the standard voltage levels that represent the logical binary states for an appropriate integrated circuit technology type, may be provided to the suppressible RFID tag 200 through the port 250. In this example, the port 250 may be a simple electrical connection. A galvanic electrical connection is not required, however, as the control signal may be input to the suppressible RFID tag 200 by, for example, inductive or capacitive coupling. If the suppressible RFID tag 200 is active rather than passive, the control signal may be multiplexed onto an electrical connection that powers the suppressible RFID tag 200 from an external source.

The control signal is provided to the control circuitry 240. Subject to the control signal, the control circuitry 240 effectively enables or suppresses the response of the transceiver 210 when the suppressible RFID tag 200 is queried by a tag reader, thereby enabling the suppressible RFID tag 200 to respond to a tag reader selectively in dependence upon the control signal. For example, if the control signal is a logical high, the control circuitry 240 may permit or enable the transceiver 210 to respond to a query from a tag reader. Conversely, if the control signal is a logical low, the control circuitry 240 may suppress or otherwise inhibit the response of the transceiver 210. Of course, the logic may differ from that just described.

Figure 2B:
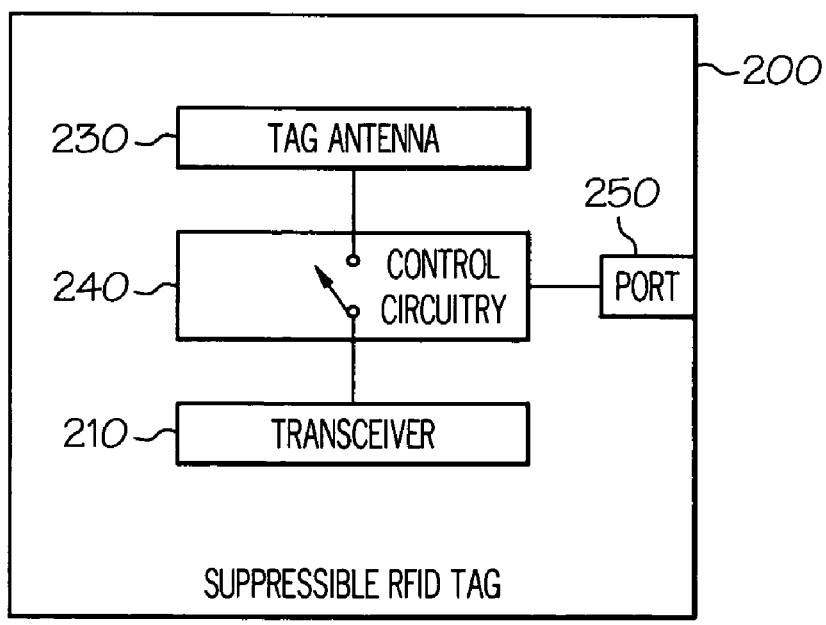

FIG. 2B shows an example of a suppressible RFID tag 200 with a particular kind of control circuitry 240. In this example, the control circuitry 240 comprises a switching device that, responsive to the control signal, makes and breaks a connection between the tag antenna 230 and the transceiver 210, so that an emission from the transceiver 210 can or cannot reach the tag antenna 230. The switching device may be, for example, a biased PIN diode, a field effect transistor (FET), a MEMS device, or the like; the control circuitry 240 or the port 250 may include an appropriate driver for the switching device.

In other embodiments, the switching device may have a single-pole-double-throw structure that connects the transceiver 210 to the tag antenna 230 in one state, and, in the other state, connects the transceiver 210 to a dummy load such as a strip resistor deposited within the suppressible RFID tag 200. In this embodiment, emissions from the transceiver 210 are radiated by the tag antenna 230, or suppressed by shunting them to ground through the resistor. Such a switching device can be easily implemented by a pair of diodes or transistors, as would be well known to those skilled in circuit design.

It is not a necessary condition of the invention that the mechanism for suppressing the output of the suppressible RFID tag 200 involve manipulating the RF path between the transceiver 210 and the tag antenna 230. Rather, in yet other embodiments of the suppressible RFID tag 200 the control circuitry 240 may make and break power to the transceiver 210, disable the transceiver 210 at intermediate points internal to the transceiver 210, and the like.

Figure 3:
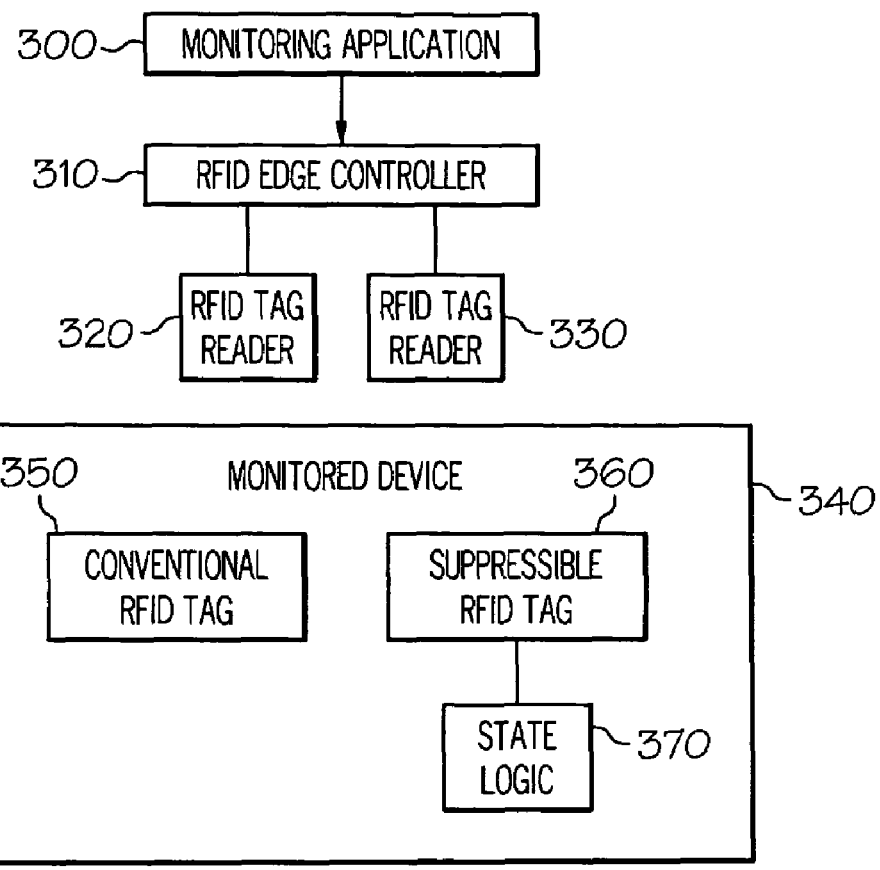
FIG. 3 is a block diagram that shows aspects of a system for locating devices having a given state.

FIG. 3 shows a block diagram of an exemplary system for locating devices in a given state. For example, the system is suitable for use in a hospital to locate equipment carts or in a warehouse to locate forklifts. Beyond simply locating such devices, however, the system according to FIG. 3 provides information regarding the state of located devices. In the example of the hospital equipment cart, the state of a cart may be "in-use" or "available." States of this sort have two possibilities, and may therefore be represented by a single-bit binary value. Here, the term "in-use" is to be interpreted broadly, encompassing, for example, the case of "reserved," "disabled," and the like.

In other cases, states may have more than two possibilities. In the case of forklifts, the state may be a quantized battery voltage. For example, this may have four values: less than 11.5 volts, between 11.5 and 12.0, between 12.0 and 12.5, and greater than 12.5. The four values can be represented by a two-bit binary number. Thus, the four values may be represented by the bit-level contents of a two-bit register associated with the forklift's power supply. For example, register contents '00' may represent a battery voltage of less than 11.5 volts; '01' may represent a battery voltage between 11.5 and 12.0, and so forth.

It is important to emphasize that the examples of the hospital cart and the forklift are provided here only in the interest of describing the invention clearly. These examples will be used again in the description that follows. The invention, however, is not limited in any way to the nature, structure, context, or circumstances of these examples.

As shown in FIG. 3, a monitoring application 300, which may execute on a personal computer or other workstation, may provide a GUI to a user, in order that the user may control the operation of the system for locating devices having a given state. Beyond this, the monitoring application 300 is incidental to the invention.

An RFID edge controller 310 interfaces to the monitoring application 300 and to RFID tag readers 320 and 330. RFID tag reader 320 is used to locate a monitored device 340 conventionally by reading an RFID tag 350 that is associated with the monitored device 340. An RFID tag may be associated with a monitored device by placing the RFID tag on or nearby the device. For example, the RFID tag may be affixed to the monitored device 340 or to a structure nearby the monitored device 340, built into the monitored device 340, and so forth. The RFID tag 350 may be a conventional, passive RFID tag that responds to queries by an RFID tag reader such as RFID tag reader 320 independently of the state of the monitored device 340. RFID tag reader 330 is used to determine the state of the monitored device 340 by reading an RFID tag 360 associated with the device 340, where the RFID tag 360 responds to queries from an RFID tag reader such as RFID tag reader 330 selectively, in dependence upon the state of the monitored device 340. Although RFID tag readers 320 and 330 are shown as being separate RFID tag readers in FIG. 3 for descriptive clarity, in practice a single RFID tag reader may be used rather than two separate ones.

As mentioned above, the RFID tag 360 responds to queries from an RFID tag reader selectively, in dependence upon the state of the monitored device 340. In other words, the RFID tag 360 responds to queries from an RFID tag reader, or not, according to a control signal provided to the RFID tag 360, where the control signal indicates the state of the monitored device. Logic 370 provides the control signal, as described below with reference to FIGS. 4-5.

Figure 4:
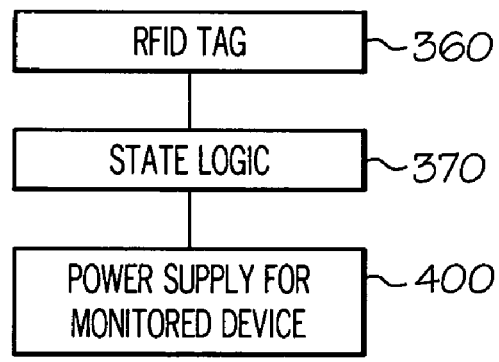
FIG. 4 is a block diagram that shows aspects of a monitored device whose state may be represented by a binary value.

FIG. 4 shows the use of the RFID tag 360 to monitor the state of a power supply 400 that powers the monitored device 340. This is an example of a case wherein the state of a monitored device may be represented by a one-bit binary value. In a preferred embodiment, the RFID tag 360 is a suppressible RFID tag like RFID tag 200. Here, the state logic 370 may be a simple threshold or voltage-conversion structure. The output voltage of the power supply 400 is sensed by the control logic 370. When the output voltage exceeds an appropriate threshold, i.e., the power supply is on, the control logic 370 enables the RFID tag 360 to respond to queries from an RFID card reader. When the output voltage falls below the threshold, i.e., the power supply is off, the control logic 370 prohibits the RFID tag 360 from responding to queries. Thus, a binary value (e.g., above or below the threshold) is indicative of the state of the monitored device 340, and the state of the monitored device 340 may be found by determining the binary value that is indicative of its state.

This approach may be extended to apply to the example of a hospital cart introduced earlier, by using the binary value describing the state of the power supply of an electrical or electronic device on a cart as a proxy for the state of the cart itself. If the power supply is on, as determined by querying the RFID tag 360, the cart may be presumed to be in-use. Likewise, if the power supply is off, the cart may be presumed to be available for use.

Figure 5:
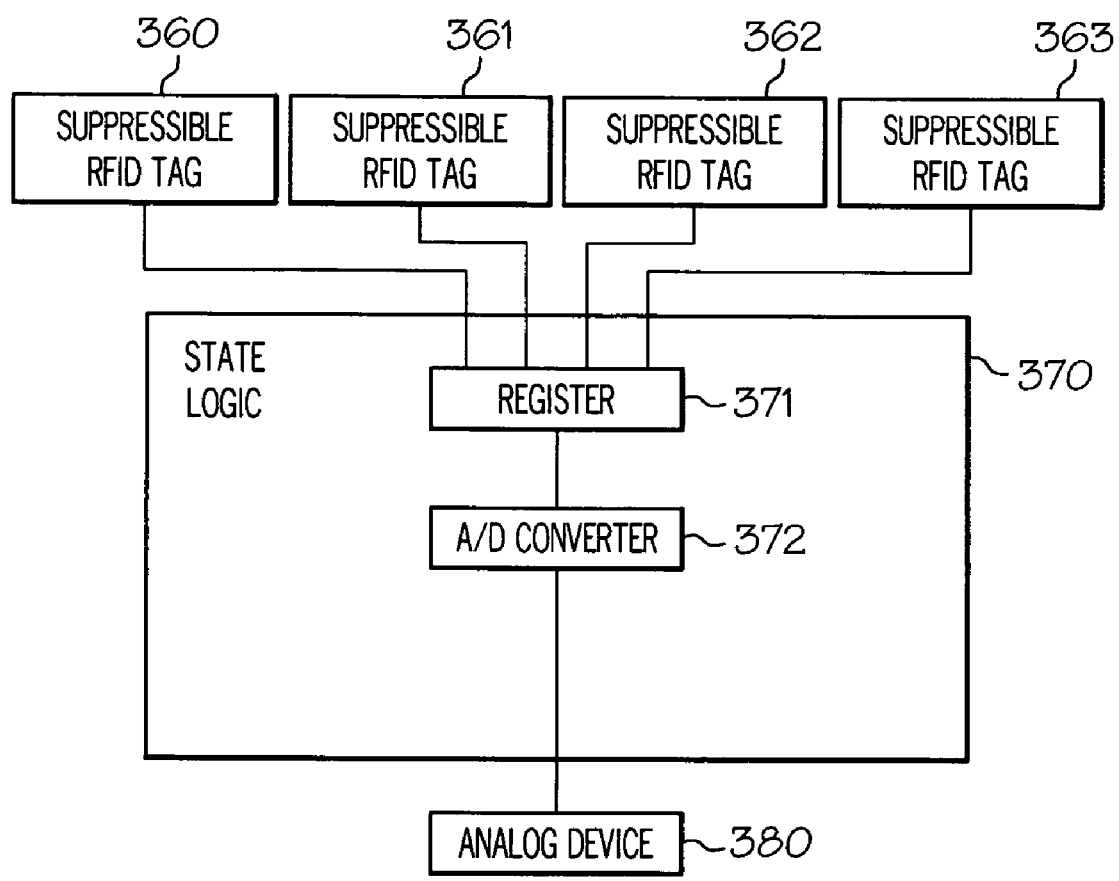
FIG. 5 is a block diagram that shows aspects of a monitored device whose state may be represented by a multi-bit value.

FIG. 5 shows the use of the RFID tag 360 to monitor the state of an analog device 380 such as a battery in, for example, a forklift. This is an example of a case wherein the state of a monitored device may be represented by a multi-bit value. Because the state considered in the situation of FIG. 5 has more possible values than the state considered in the situation of FIG. 4, specific implementations of the control logic 370 may in practice be more complex.

FIG. 5 shows an analog-to-digital (A/D) converter 372, which senses a parameter of the analog device 380, and provides a quantized digital representation. This representation is loaded into a register 371 that is associated with the monitored analog device 380. Here, the term "associated" means operably connected rather than necessarily geographically proximate. It is not a necessary condition of the invention that the register 371 be literally a separately identifiable electronic entity.

In the example introduced earlier, a battery that powers or starts a forklift may be the analog device 380. Terminal voltage of the battery may be sensed and quantized to, for example, one of sixteen levels or possibilities by the A/D converter 372, resulting in a four-bit word that is provided to the register 371. Hence, the state of the monitored analog device 380 may be found by determining the value of a four-bit word.

As shown in FIG. 5, each bit position of the register 371 has one-to-one correspondence with an RFID tag, here RFID tags 360, 361, 362, and 363, which respond selectively to queries from an RFID tag reader, each tag to convey a bit value of the register 371. Thus, the bit values of the register 371 provide control signals for RFID tags 360-363. In a preferred embodiment, the RFID tags 360-363 are suppressible RFID tags like suppressible RFID tag 200 described earlier.

For example, suppose that the first bit of the register 371 has the binary value 1, the second bit has the binary value 1, the third bit has the value binary 0, and the fourth bit has the binary value 0. In this case, RFID tags 360 and 361 are enabled to respond to queries from RFID tag reader 330, whereas RFID tags 362 and 363 are prohibited from responding. So, by querying the RFID tags 360-363, the RFID tag reader 330 is able to deduce the contents of the register 371, and thereby determine the state of the monitored analog device 380 by effectively reading the register 371.

It is important to note that although the example just given concerns an analog device 380, this is not a limitation of the invention. Rather, the invention applies as well when the monitored device provides a direct digital output. In such a case, the A/D converter 372 would not be needed.

Figure 6:
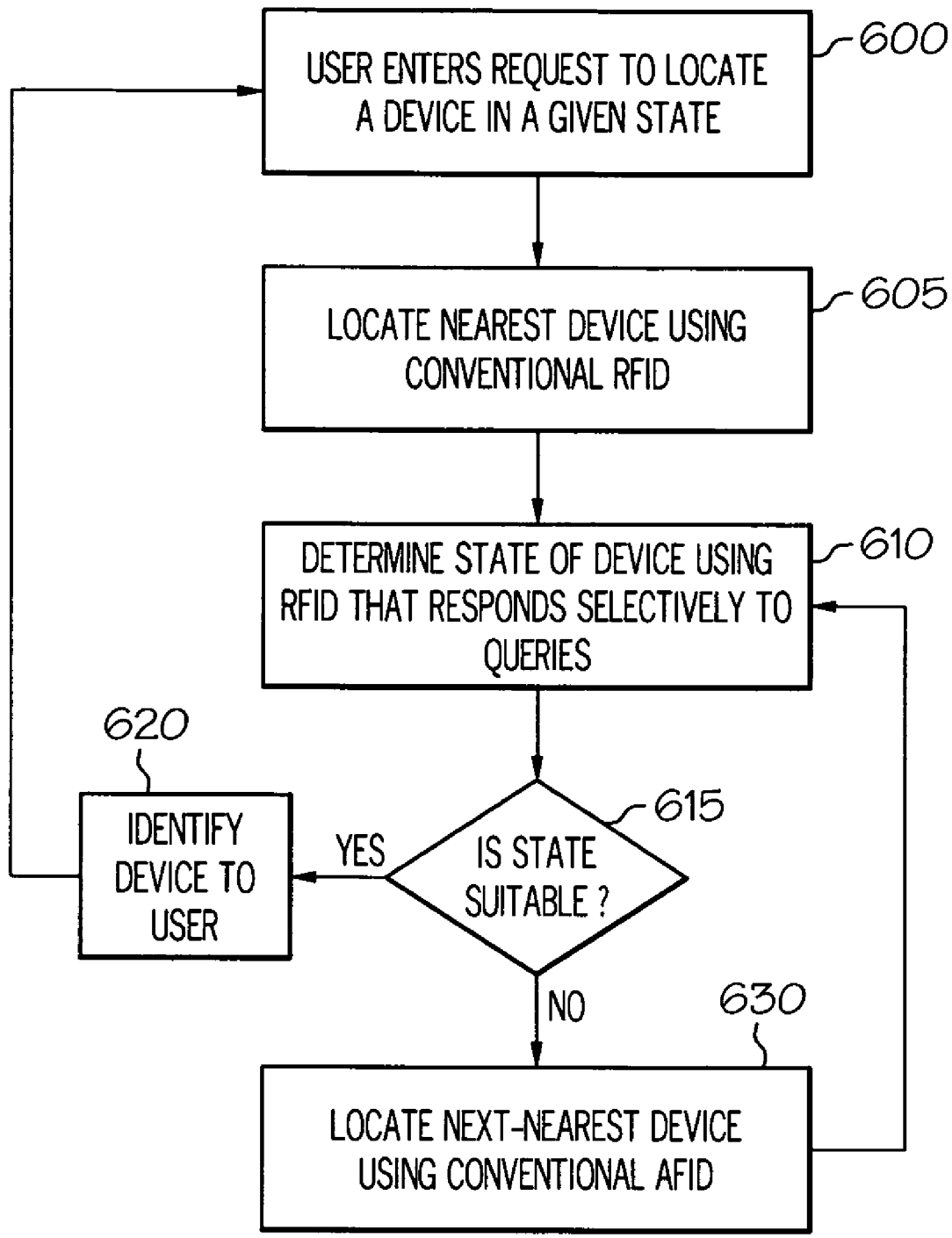
FIG. 6 is a flowchart that shows aspects of a method for locating devices that have a given state.

FIG. 6 shows aspects of a method for locating devices that have a given state. A user who wishes to locate such a device enters a request through the GUI provided by the monitoring application 300 (block 600). The nearest device is located (block 605) conventionally, using an RFID networked-system application, through the capabilities of the RFID tag reader 320 and the conventional RFID tag 350. The state of the located device is then determined (block 610) as described earlier, using the capabilities of the RFID tag reader 330 and the RFID tag 360 or RFID tags 360-363, which respond to queries selectively in dependence upon the state of the located device as described earlier. If the determined state is suitable with regard to the user's request (block 615; yes), the located device is identified to the user (block 620), and the method returns to await another request (block 600).

Otherwise (i.e., the determined state is not suitable; block 615, no), the next nearest device is located (block 630), using the RFID networked-system application, through the capabilities of the RFID tag reader 320 and the conventional RFID tag 350. The method returns to block 610 to determine the state of this next-nearest located device, as described above. From this point, the method continues iteratively, until a device having a suitable state is located, or until all of the devices under the purview of the system have been examined without finding a device having a suitable state.

Although the foregoing has described methods, computer program products, and systems for locating devices having a given state, the description of the invention is illustrative rather than limiting; the invention is limited only by the claims that follow.

We claim:

1. A method for locating a device in a given state, comprising:
    locating a device using an RFID tag reader and a first RFID tag associated with the device; and
    determining the state of the device using an RFID tag reader and a second RFID tag associated with the device;
    wherein the first RFID tag responds to queries from an RFID tag reader independently of the state of the device, and the second RFID tag responds to queries from an RFID tag reader selectively in dependence upon the state of the device.

2. The method of claim 1, wherein the RFID tag reader for locating the device and the RFID tag reader for determining the state of the device are the same RFID tag reader.

3. The method of claim 1, wherein determining the state of the device comprises determining a binary value indicative of the state of the device.

4. The method of claim 3, wherein the binary value indicates whether the device is in-use when the second RFID tag is read.

5. The method of claim 4, wherein the second RFID tag is a suppressible RFID tag.

6. The method of claim 5, wherein the suppressible RFID tag monitors a power supply of the device.

7. The method of claim 1, wherein determining the state of the device comprises determining a multi-bit value indicative of the state of the device.

8. The method of claim 7, wherein determining the multi-bit value comprises reading a register associated with the device using a plurality of RFID tags.

9. The method of claim 8, wherein reading the register comprises reading a plurality of suppressible RFID tags that are in one-to-one correspondence with bits of the register, each suppressible RFID tag conveying a bit value of the register when read.

* * * * *